US011186989B2

(12) United States Patent
Schreiber

(10) Patent No.: US 11,186,989 B2
(45) Date of Patent: Nov. 30, 2021

(54) EQUIPMENT SUPPORT SYSTEM AND METHOD OF SUPPORTING EQUIPMENT

(71) Applicant: Kevin Joseph Schreiber, Happy Valley, OR (US)

(72) Inventor: Kevin Joseph Schreiber, Happy Valley, OR (US)

(73) Assignee: SLD TECHNOLOGY, INC., Portland, OR (US)

( * ) Notice: Subject to any disclaimer, the term of this patent is extended or adjusted under 35 U.S.C. 154(b) by 0 days.

(21) Appl. No.: 15/288,168

(22) Filed: Oct. 7, 2016

(65) Prior Publication Data

US 2017/0101779 A1    Apr. 13, 2017

Related U.S. Application Data

(60) Provisional application No. 62/238,614, filed on Oct. 7, 2015.

(51) Int. Cl.
| | | |
|---|---|---|
| *E04B 9/00* | (2006.01) | |
| *F16M 13/02* | (2006.01) | |
| *E04B 9/02* | (2006.01) | |
| *A61G 13/10* | (2006.01) | |
| *A61G 12/00* | (2006.01) | |

(52) U.S. Cl.
CPC ............ *E04B 9/006* (2013.01); *A61G 13/107* (2013.01); *E04B 9/003* (2013.01); *E04B 9/02* (2013.01); *F16M 13/027* (2013.01); *A61G 12/004* (2013.01); *A61G 13/108* (2013.01)

(58) Field of Classification Search
CPC . E04B 9/345; E04B 9/006; E04B 9/02; E04B 9/22; E04B 9/003; A61G 10/00; A61G 13/108; A61G 13/107; A61G 12/004; F16M 13/027
USPC ...... 52/39, 220.6, 506.06; 248/343; 454/187
See application file for complete search history.

(56) References Cited

U.S. PATENT DOCUMENTS

| | | | | |
|---|---|---|---|---|
| 3,782,065 A | * | 1/1974 | Griffing .................. | E04B 9/006 52/39 |
| 3,931,452 A | * | 1/1976 | Nilsson .................... | E04F 17/08 174/491 |
| 4,250,668 A | * | 2/1981 | Harrison, Jr. ............. | E04B 9/34 52/39 |
| 4,660,799 A | * | 4/1987 | Butland ................... | A61B 6/00 248/317 |
| 4,711,322 A | * | 12/1987 | Orndorff ............. | B66B 11/0226 187/401 |
| 4,883,511 A | * | 11/1989 | Gustin ................. | B01D 46/002 55/355 |
| 5,141,473 A | * | 8/1992 | Swaney ................ | F24F 13/072 454/299 |
| 6,047,509 A | * | 4/2000 | Savoie .................. | E04B 2/7425 403/231 |

(Continued)

FOREIGN PATENT DOCUMENTS

WO    WO-2017017480 A1 *  2/2017  ............... E04B 9/02

*Primary Examiner* — Theodore V Adamos
(74) *Attorney, Agent, or Firm* — Tucker Ellis, LLP

(57) ABSTRACT

A mounting system includes a frame that defines a truss structure and a plurality of mounting locations within the truss structure. The plurality of mounting locations are configured to interchangeably couple to one or more members, including one or more of an access panel, a light troffer or a boom mount.

20 Claims, 13 Drawing Sheets

(56) References Cited

U.S. PATENT DOCUMENTS

| | | | | |
|---|---|---|---|---|
| 6,089,518 A * | 7/2000 | Nilsson | A61G 12/002 | 248/317 |
| 6,314,702 B1 * | 11/2001 | Huang | E04B 9/0428 | 52/281 |
| 6,511,522 B1 * | 1/2003 | Gomez | E04B 9/02 | 454/187 |
| 7,204,714 B2 * | 4/2007 | Walker | A61G 12/005 | 439/532 |
| 7,795,533 B2 * | 9/2010 | Bravo | H02G 3/16 | 174/50 |
| 8,028,481 B2 * | 10/2011 | Deschenes | E04B 9/005 | 52/311.2 |
| 8,051,610 B2 * | 11/2011 | Chance | H01R 35/00 | 248/284.1 |
| 8,308,536 B2 * | 11/2012 | Kristensson | F24F 3/1607 | 454/284 |
| 2002/0134061 A1 * | 9/2002 | McGill | E04B 9/02 | 55/385.2 |
| 2004/0128927 A1 * | 7/2004 | Cole | E04B 9/006 | 52/220.6 |
| 2005/0210801 A1 * | 9/2005 | Schoolcraft, Sr. | E04B 9/0478 | 52/506.01 |
| 2009/0188197 A1 * | 7/2009 | Irizarry | E04B 9/006 | 52/655.1 |
| 2009/0223131 A1 * | 9/2009 | Wiese | E06B 3/485 | 49/197 |
| 2010/0103654 A1 * | 4/2010 | Yasuda | E04B 9/006 | 362/147 |
| 2011/0097986 A1 * | 4/2011 | Cursetjee | F24F 13/32 | 454/187 |
| 2012/0018610 A1 * | 1/2012 | Kempf | B66D 3/18 | 248/636 |
| 2013/0344795 A1 * | 12/2013 | Schreiber | F24F 13/078 | 454/293 |
| 2015/0308617 A1 * | 10/2015 | Sareyka | E04B 9/127 | 52/506.07 |
| 2016/0060866 A1 * | 3/2016 | Holmgren | E04B 9/006 | 52/173.1 |

* cited by examiner

EQUIPMENT SUPPORT SYSTEM AND METHOD OF SUPPORTING EQUIPMENT

CROSS-REFERENCE TO RELATED APPLICATIONS

This nonprovisional application claims the benefit of and priority to U.S. Provisional Application No. 62/238,614, filed Oct. 7, 2015. The disclosure of the prior application is hereby incorporated by reference herein in its entirety.

BACKGROUND OF THE DISCLOSURE

Hospital operating rooms typically include surgical equipment located over and around a surgical site. The surgical equipment is mounted to the ceiling and may be movable in relation to a surgical site target zone, such as on a boom arm.

The mounting arrangement for the surgical equipment is customized with a fixed arrangement for the mounting locations. Accordingly, if new equipment is to be installed or equipment is to be moved to different locations in the operating room, a new mounting arrangement is required, which may result in having to replace the entire existing mounting arrangement. Alternatively, costly changes may have to be made to accommodate the new equipment or the new equipment position.

Moreover, because the surgical equipment (e.g., surgical light) may be positioned directly over or in proximity to the surgical target zone, the mount for the surgical equipment in that location may block airflow generated by an air supply arrangement and create a low pressure zone underneath the mount location. The low pressure zone causes air turbulence thereunder. Due to turbulent airflow, various contaminants generated through a surgical procedure may be circulated within the surgical environment. For example, surgical staff may carry particulate and bacterial contaminants that may be dispersed directly above a surgical site in the absence of filtered, downward, unidirectional flow. Further, bone fragments, biological fluids, and blood may be projected upward toward the surgical equipment, which is cleaned and sterilized between surgical procedures.

Accordingly, a need exists for a system and method of providing adaptable equipment mounting in a surgical environment that allows for easily mounting new equipment or changing the location of existing equipment. A need also exists for a system and method of providing uninterrupted, reduced turbulence airflow underneath the mounts for surgical equipment, as well that reduces the possibility of contaminants being dispersed over and within a surgical site.

SUMMARY OF THE DISCLOSURE

Certain embodiments of the present disclosure provide a mounting system that includes a frame that defines a truss structure and a plurality of mounting locations within the truss structure. The plurality of mounting locations are configured to interchangeably couple to one or more members, including one or more of an access panel, a light troffer or a boom mount.

Certain embodiments of the present disclosure provide an operating room that includes a floor connected to walls and a ceiling connected to the walls, wherein a surgical site is disposed at an area between the floor, the walls, the and ceiling. The operating room further includes a mounting system coupled to the ceiling, the mounting system defines a truss structure and a plurality of mounting locations within the truss structure. The plurality of mounting locations are configured to interchangeably couple to one or more of an access panel, a light troffer or a boom mount.

Certain embodiments of the present disclosure provide a mounting system that includes a frame that defines a truss structure having a plurality of cross member defining openings therethrough, and a plurality of mounting locations within the truss structure at the openings. The plurality of mounting locations are configured to interchangeably couple to one or more components for use in a sterile environment.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a mounting system or arrangement for mounting equipment, such as surgical equipment within an operating room. For example, in various embodiments, a truss arrangement is provided that allows for interchangeable coupling of surgical equipment (and other devices or members) to different locations within the operating room, as well as flexibility to couple different components using the mounting system. For example, in some embodiments, the mounting arrangement allows for interchangeable mounting of access panels, light troffers and boom mounts for surgical equipment. Thus, one or more embodiments provide a mounting system that allows for the modular design and redesign of the operating room without a change in the mounting structure.

Figure 1:
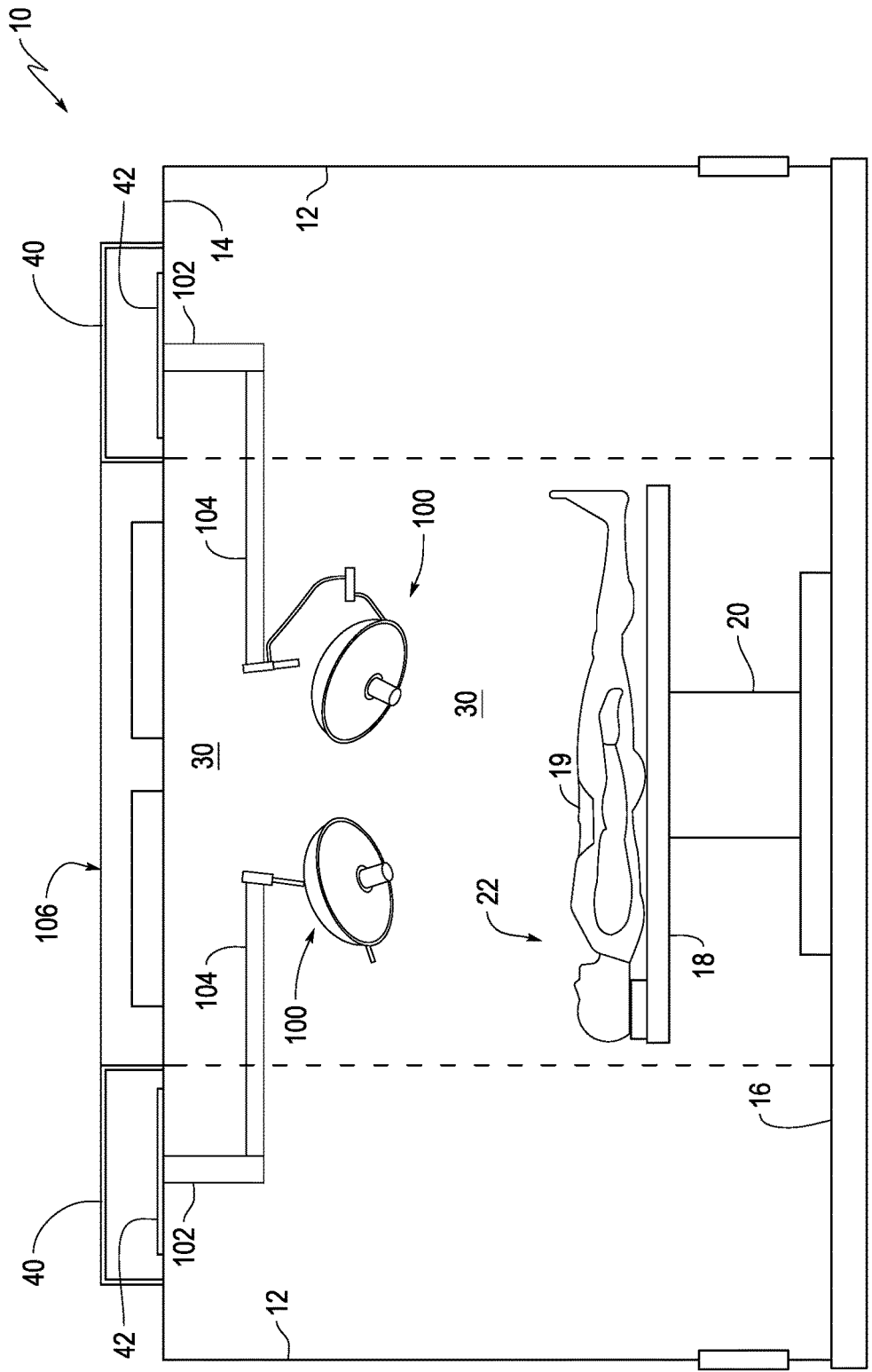
FIG. 1 illustrates a lateral view of an operating room, according to an embodiment of the present disclosure.

FIG. 1 illustrates a lateral view of an operating room 10, according to an embodiment of the present disclosure. The operating room 10 may be defined by walls 12, a ceiling 14, and a floor 16. An operating table 18 may be supported on the floor 16. The operating table 18 may include a support bed 20 that is configured to support a patient 22. A surgical site 19 may be located on the patient 22.

Surgical equipment, which in the illustrated embodiment is a surgical light system 100 is suspended from the ceiling 14 above the operating table 18, which may define a sterile field 30. A support beam 102 extends downwardly from the ceiling 14 and is coupled to a mounting arrangement 40 as described in more detail herein. The mounting system 40, which in various embodiments includes a truss arrangement, for example, a perimeter truss arrangement that extends around a perimeter of the sterile field 30. Accordingly, mounting plates 42 are easily positionable at different locations outside of the sterile field 30 such that one or more boom arms 104 may extend from the support beam 102 into the sterile field 30. As shown in FIG. 1, two surgical light assemblies 100 may be coupled to two separate and distinct boom arms 104 mounted to different locations on the mounting system 40. Alternatively, more or less surgical light assemblies 100 than shown may be used. It should be appreciated that the surgical light system 100 is shown only for illustrative purpose and different or additional surgical equipment may be suspended from the ceiling 14.

A supply air array 106 (also referred to as an air frame system) may be secured to the ceiling 104 within the mounting system 40. The supply air array 106 may be provided as described in co-pending application. By positioning the mounting plates 42 outside of (along the perimeter) of the supply air array 106, laminar airflow is created directly to the surgical target zone without turbulence that could otherwise be caused by having the mounting plates 42 within the supply air array 106 or within the sterile field 30.

Figure 2:
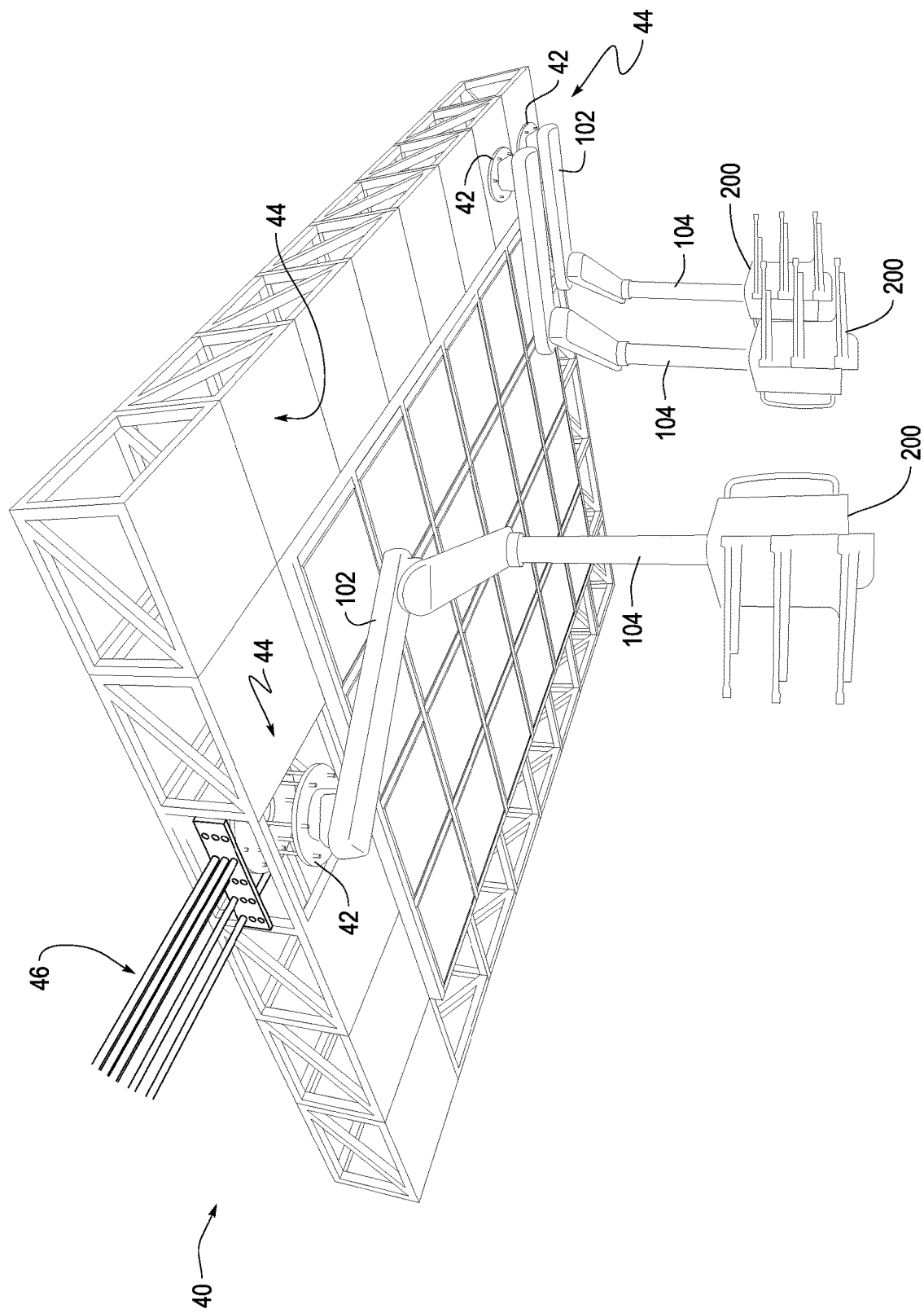
FIG. 2 illustrates a perspective bottom view of a mounting system, according to an embodiment of the present disclosure.

FIG. 2 illustrates the mounting system 40 and shows the mounting plates 42 mounted to different mounting locations 44 defined within the truss structure of the mounting system 40. The truss structure of the mounting system 40 allows for interchangeable mounting of the mounting plates 42 to any of the plural mounting locations 44 of the mounting system 40. As can been seen, the mounting locations 44 are located along a perimeter of supply air array 106. Accordingly, for example, the mounting system 40 may be coupled to the walls 12 and/or ceiling 14, with the supply air array 106 coupled within the mounting system 40. Additionally, the mounting system 40 allows for easy access for medgas connections 46.

Figure 3:
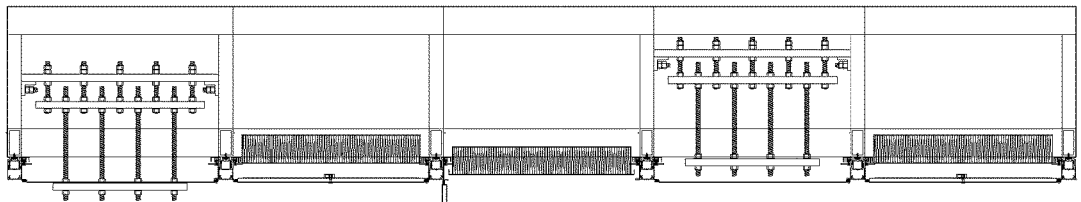
FIG. 3 illustrates a side lateral view of a mounting system, according to an embodiment of the present disclosure.
Figure 4:
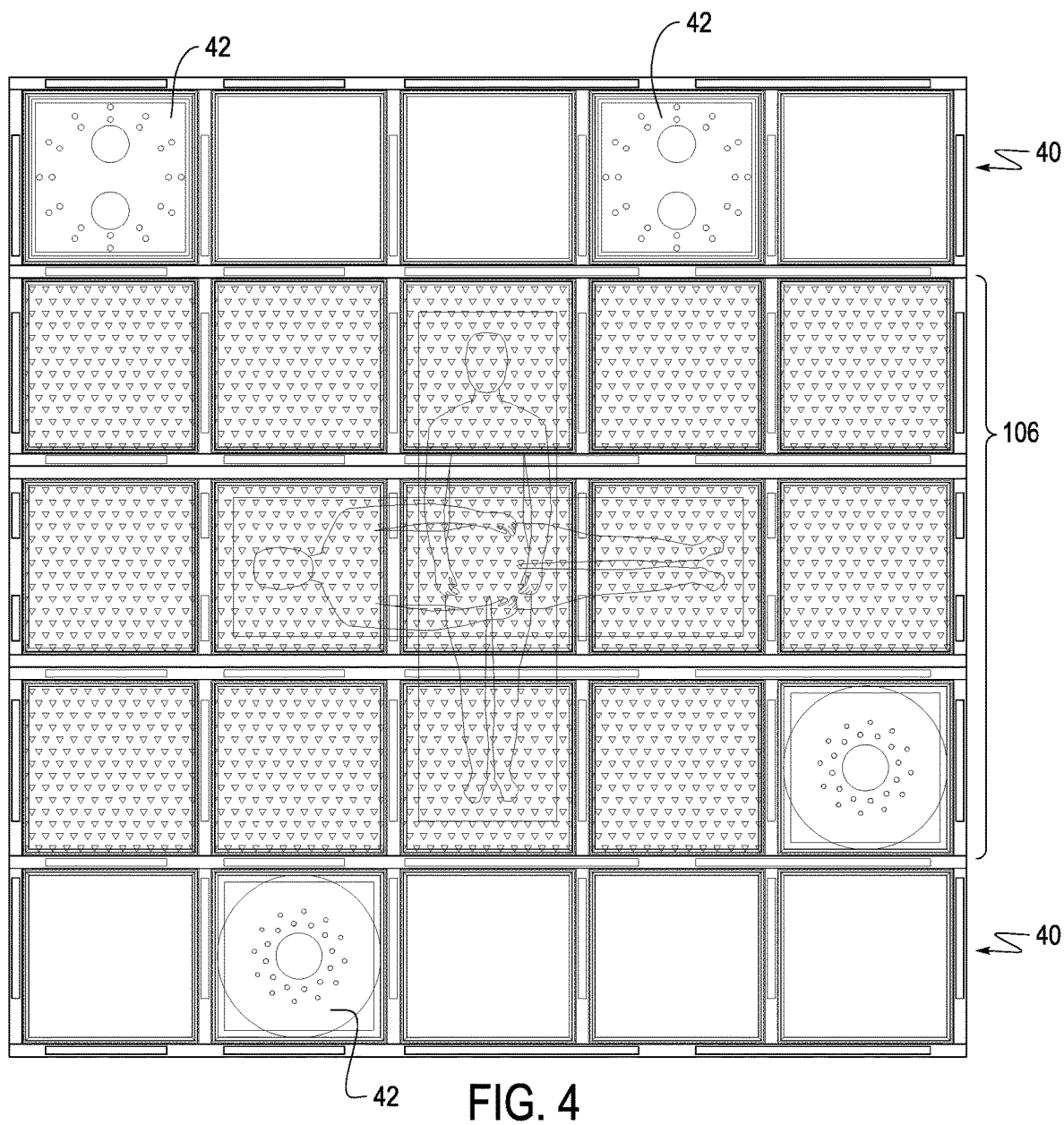
FIG. 4 illustrates a top plan view of a mounting system, according to an embodiment of the present disclosure.
Figure 5:
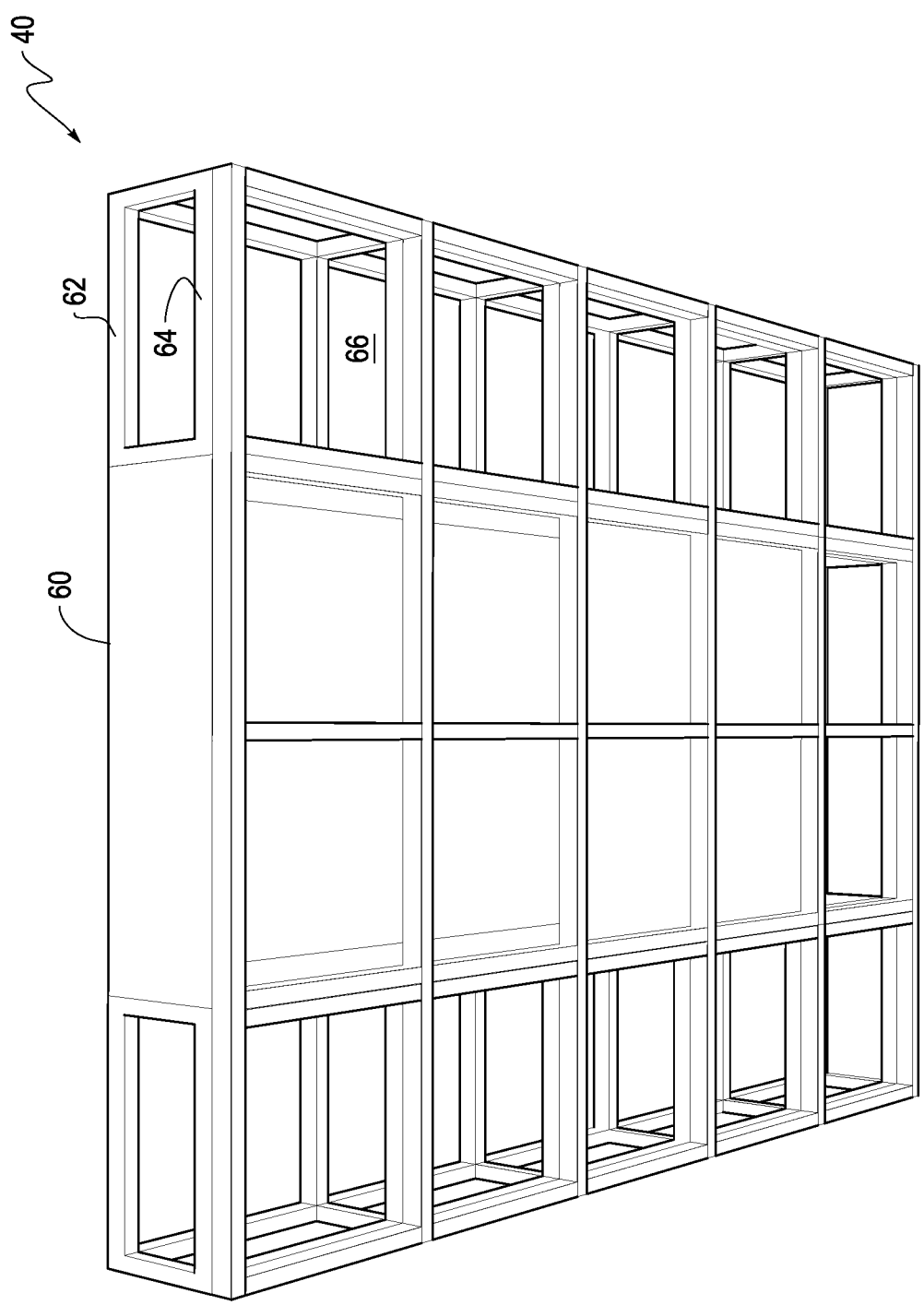
FIGS. 5-10 illustrate perspective views of a mounting system, according to embodiments of the present disclosure.
Figure 6:
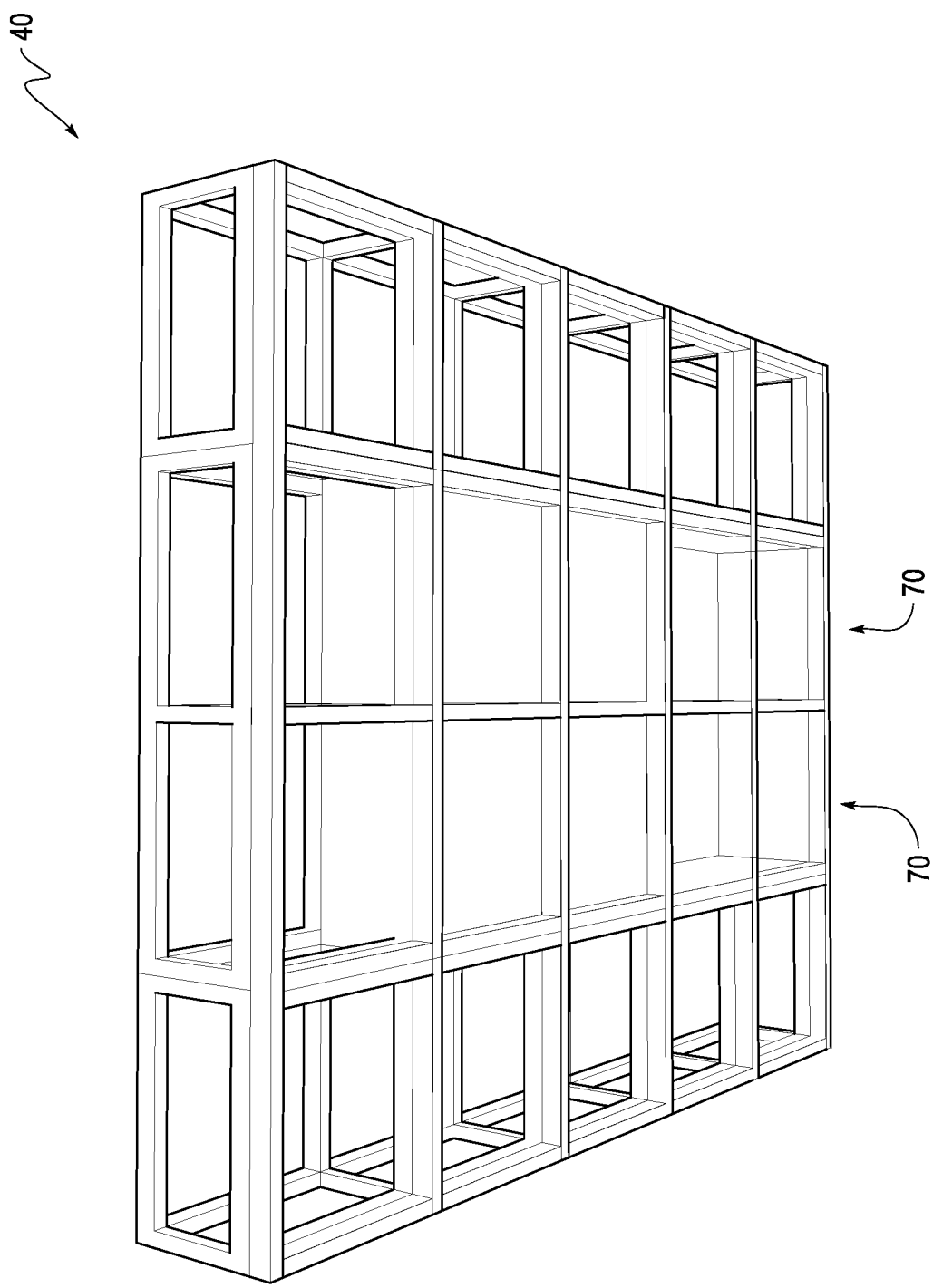
Figure 7:
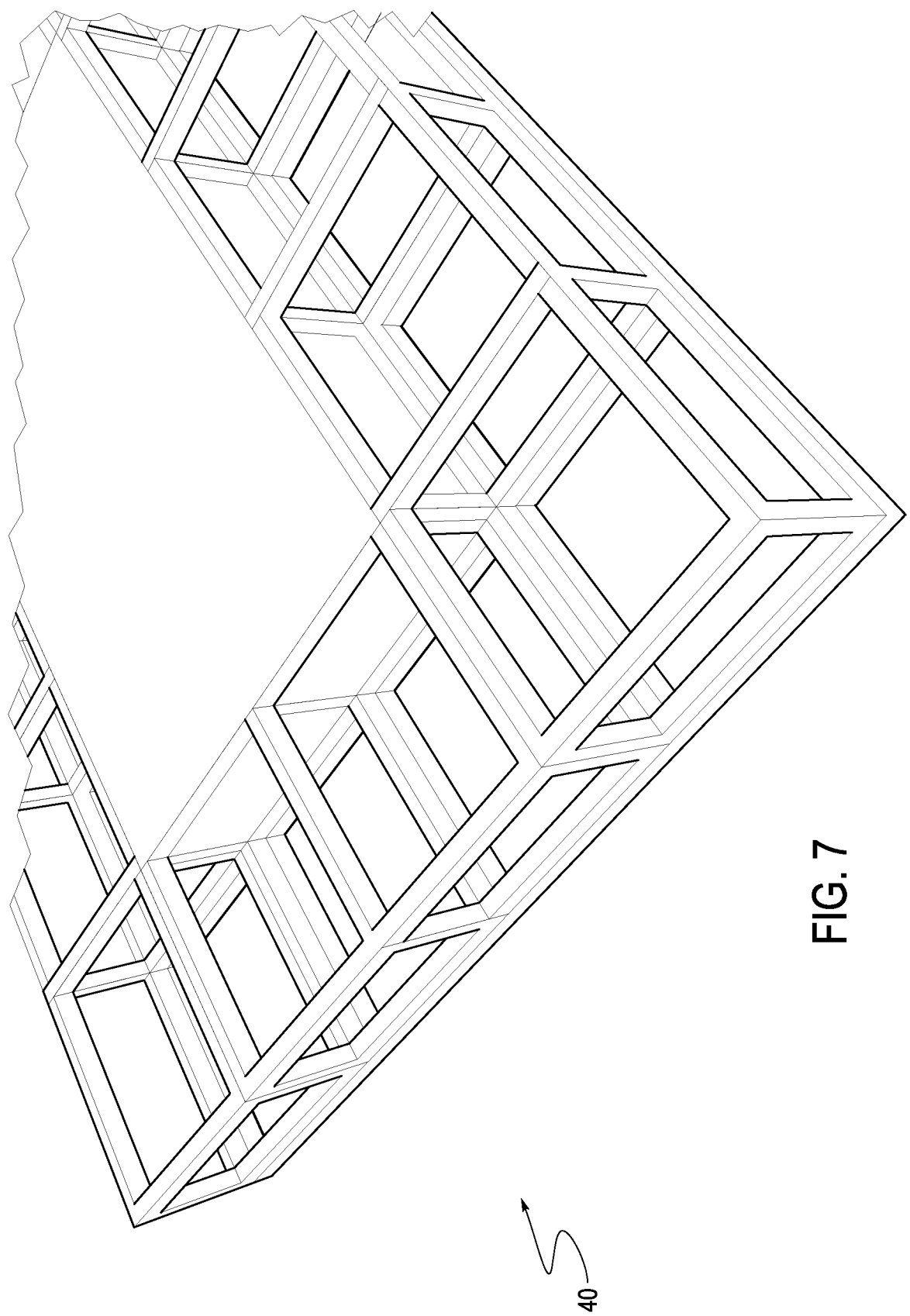
Figure 8:
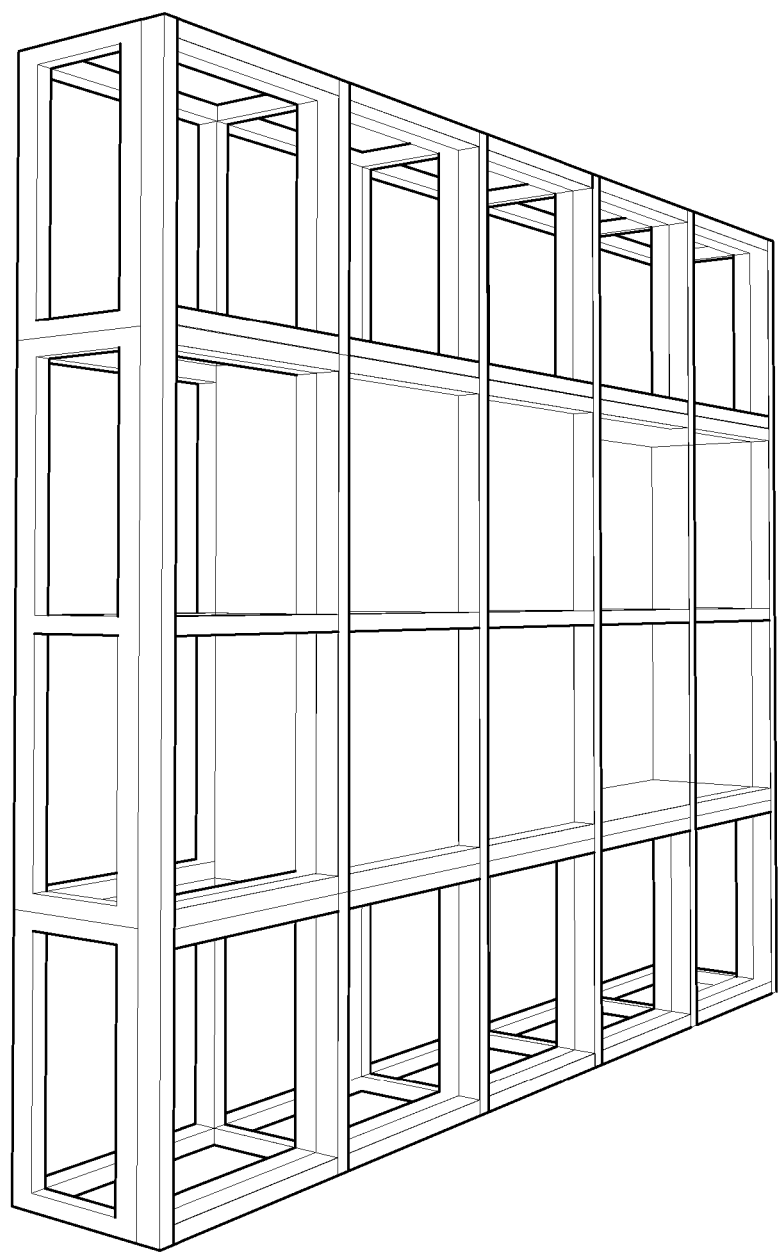
Figure 9:
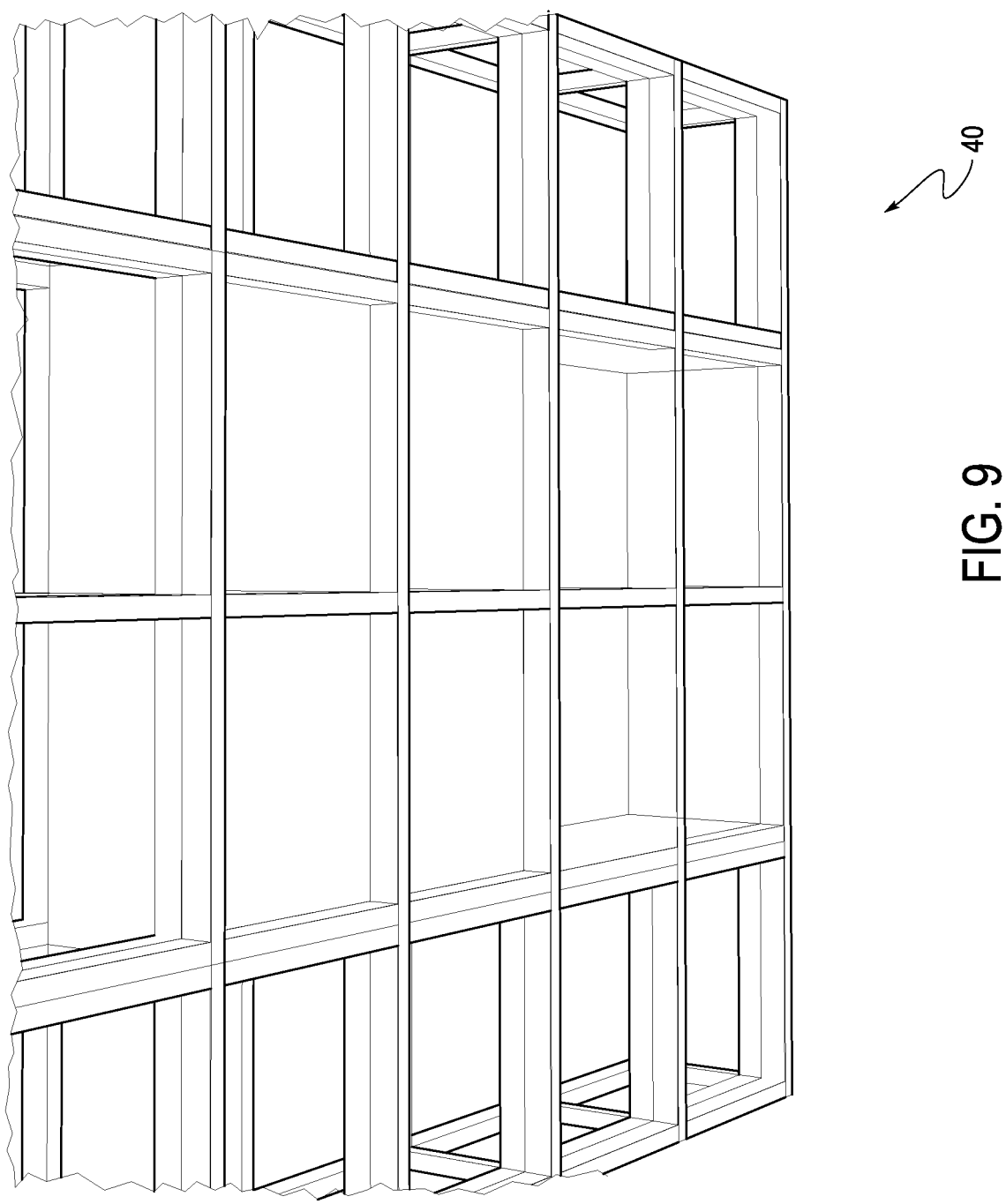
Figure 10:
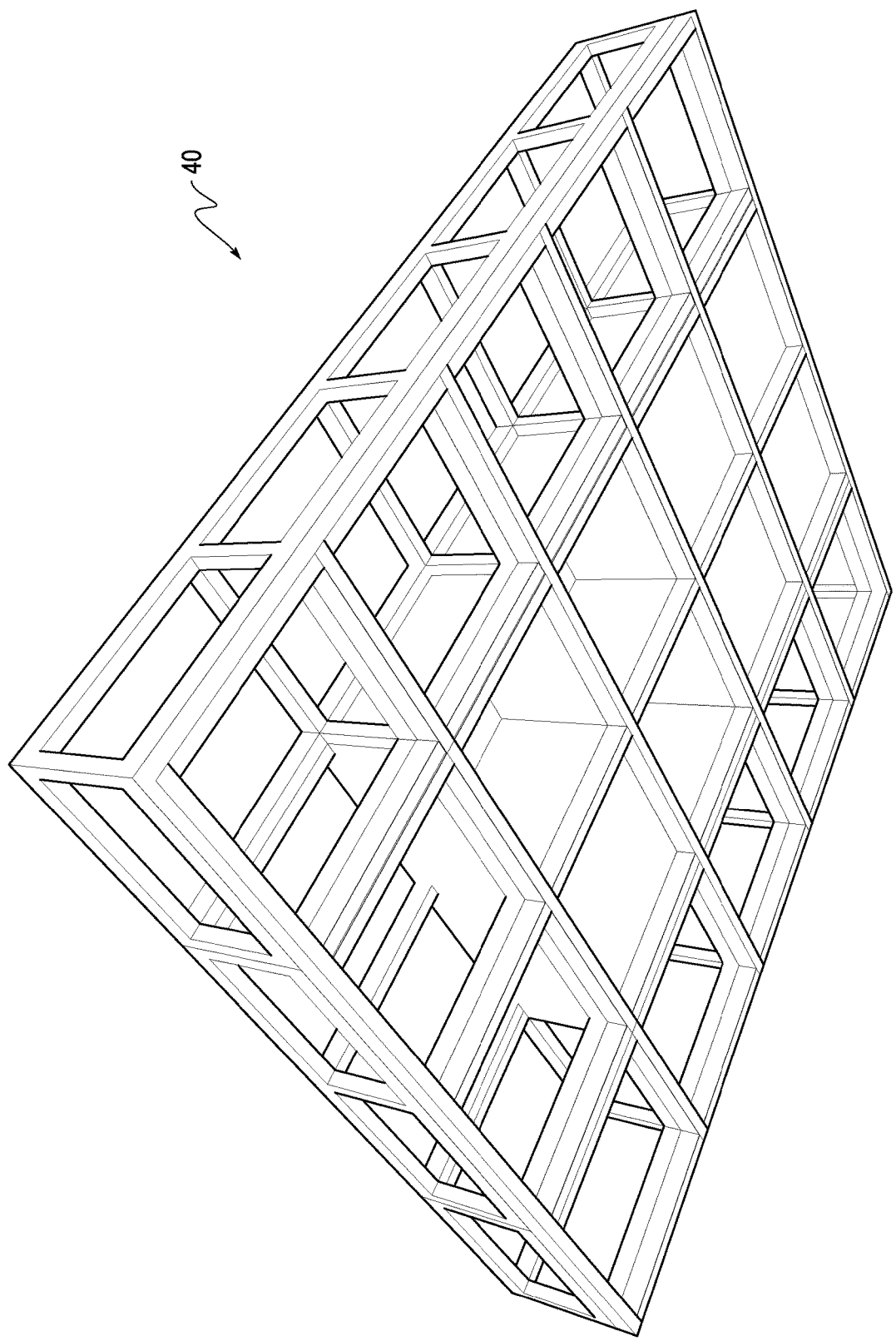

The different mounting locations 44 allow for mounting the mounting plates 42 thereon. However, the mounting locations 44 also provide interchangeable mounting of different components thereto, such as access panels or light troffers, among other components. For example, as shown in FIGS. 3 and 4, the mounting system 40 may be located on two sides of the supply air array 106 (as viewed in FIG. 4) and includes five different mounting locations 44 on each of the sides of the supply air array 106. As can be seen, the mounting locations 44 may be configured differently, such as to define different mounting types, such as different configurations of mounting plates 42 that include different mounting patterns of bore locations for securing thereto different components (e.g., bolt connection).

Figure 15:
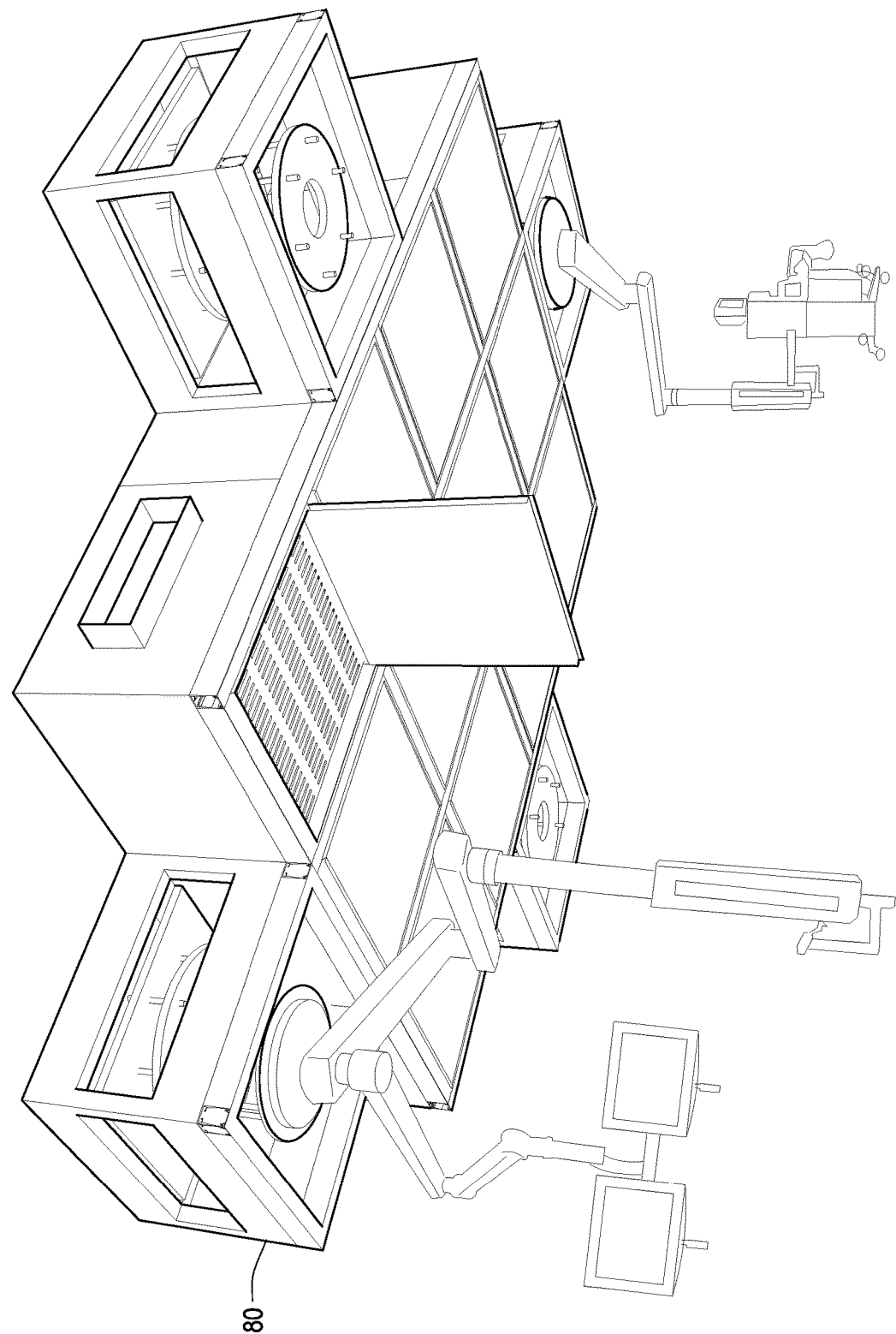
FIG. 15 illustrates a perspective bottom view of a mounting system, according to an embodiment of the present disclosure.

FIGS. 5-10 illustrate a mounting system 40, according to an embodiment of the disclosure. As can be seen, in the illustrated embodiment, the mounting system 40 includes a frame 60 that extends around a portion of the perimeter of the supply air array 106. The frame 60 is formed from a top support structure 62 and a bottom support structure that include openings 66 that define the different mounting locations 44. Thus, a box-type truss structure is formed by the top and bottom support structures 62 and 64. The openings 66 are sized and shaped to accommodate mounting thereto different interchangeable components, such as the mounting plate 42. It should be appreciated that although the mounting system 40 is illustrated as extending along only two sides of the supply air array 106 (the left and right sides as viewing in FIG. 5), the mounting system 40 may extend around additional or fewer sides of the supply air array 106. For example, the mounting system 40 may be provided along all four sides of the supply air array 106. In addition, the mounting system may be configured with a single flex truss cell 80 and may be fixed in multiple locations as shown in FIG. 15. The frame 60 and the components thereof may be formed of any suitable materials, such as one or more metals or metal composites.

The frame 60 may have mounted thereto, or support therefrom, one or more modules 70, which may be positioned at different locations of the frames (in the FIGS. 5-10 the modules are positioned along a middle of one axis of the frame 60, but do not entirely extend from end to end. However, other configurations are contemplated that extend from end to end or beyond the middle portion or along different axes.

Figure 11:
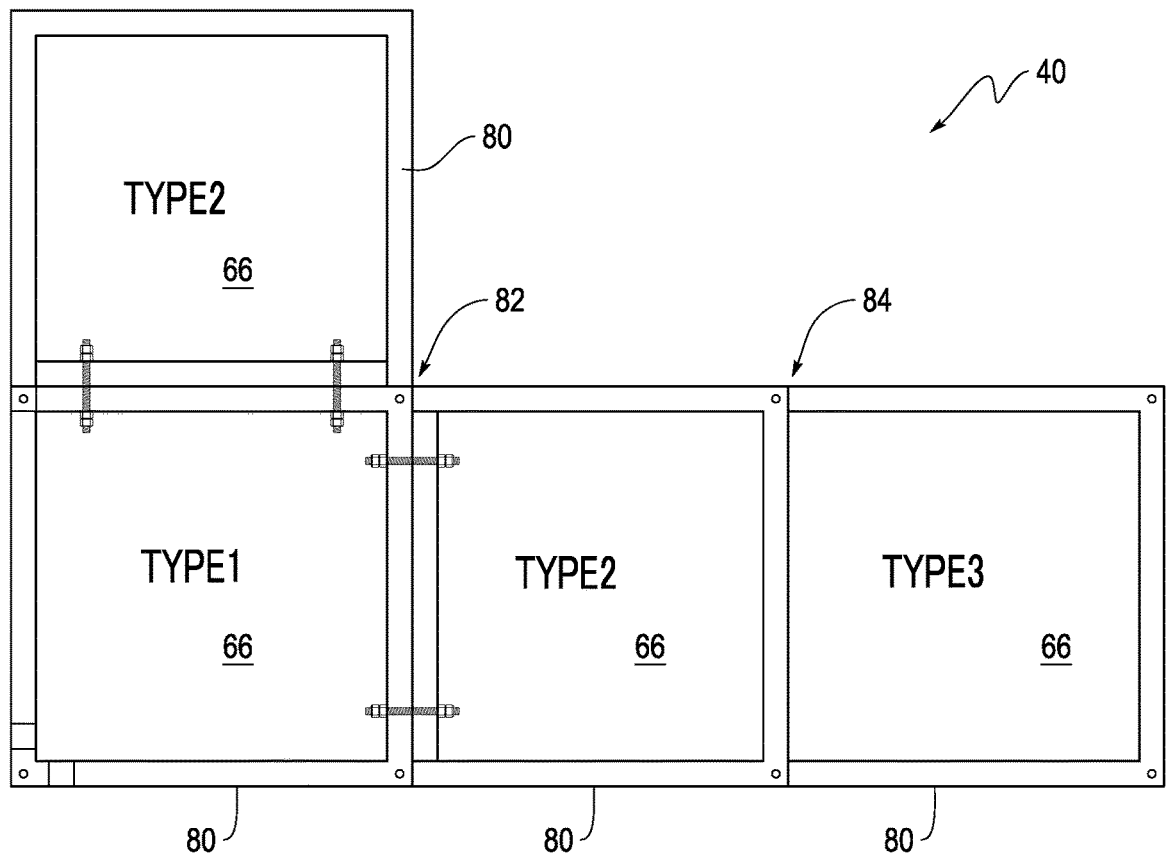
FIG. 11 is a plan view of one configuration of a mounting system, according to embodiments of the present disclosure.
Figure 12:
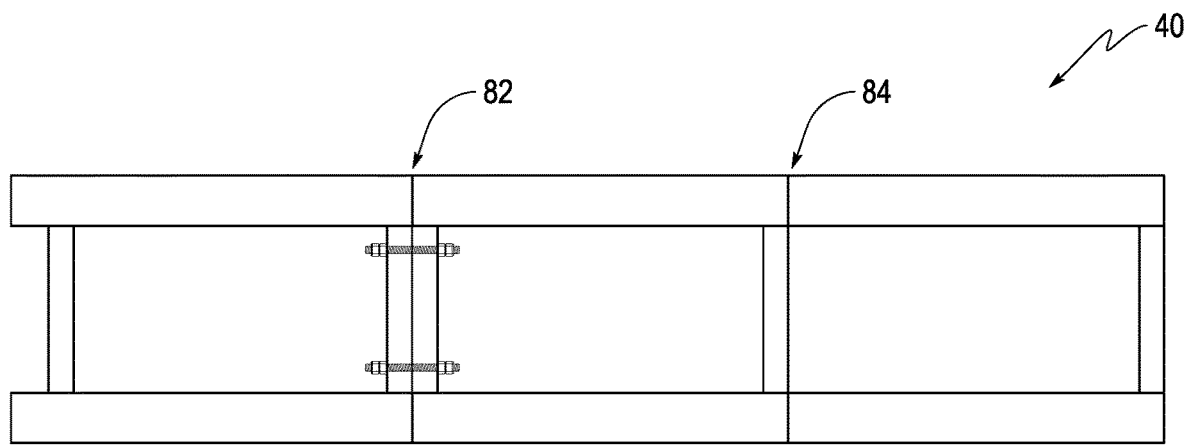
FIG. 12 is a side elevation view of one configuration of a mounting system, according to embodiments of the present disclosure.

In some embodiments, the mounting system 40 includes plural truss types 80 (shown as Types 1, 2 and 3) as illustrated in FIGS. 11 and 12 that allows for creating different configurations. For example, in one embodiment, the mounting system 40 includes three different truss types, which are configured for supporting different components or modules. The mounting system 40 in various embodiments allows for adjustable mounting of equipment in both the horizontal and vertical directions. For example, horizontal adjustment is provided by moving from one opening 66 to the next opening 66 and vertical adjustment is provided my moving up or down into predefined coupling positions (e.g., bolting positions), or any other fixing method. It should be noted that the truss types 80 in the figures define truss modules or truss member that are coupled together, such as with a bolted connection 82 or a welded connection 84.

Figure 13:
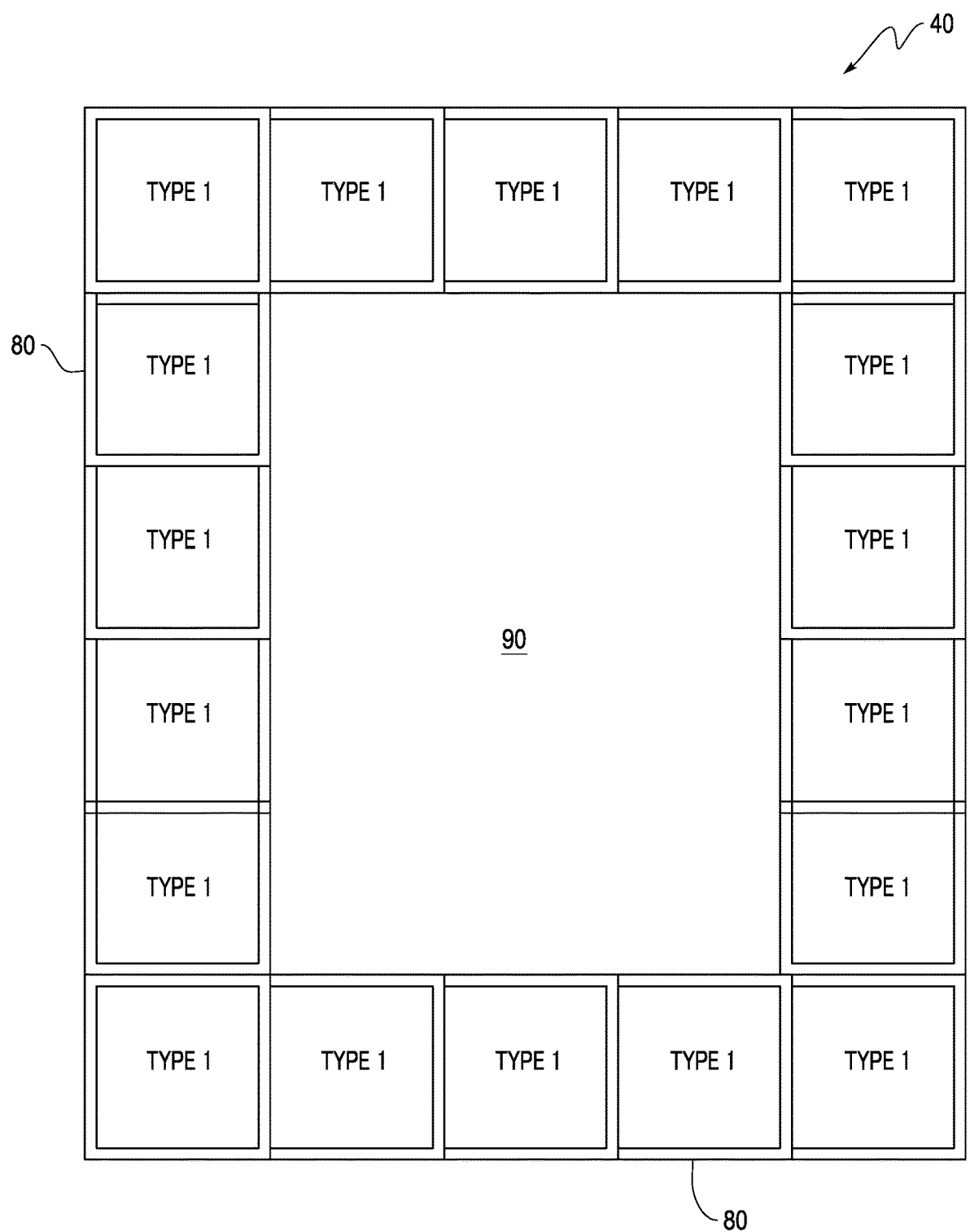
FIG. 13 is a diagram of another configuration of a mounting system, according to embodiments of the present disclosure.

FIG. 13 illustrates a configuration of the mounting system 40 that includes three truss types 80 coupled in a rectangular arrangement having a center open region 90. As can be seen, the truss types 80 may be varied and place in different locations such that the number and position of each may be varied. For example, adjacent truss elements may be of the same truss type 80 or of different truss types 80, such as having a different configuration, different mounting arrangement, different mounting holes, different sizes, etc.

It should be noted that although the supply air array 106 is shown mounted within the mounting system 40, the supply air array 106 may be mounted below the mounting system 40 to the truss structure.

Figure 14:
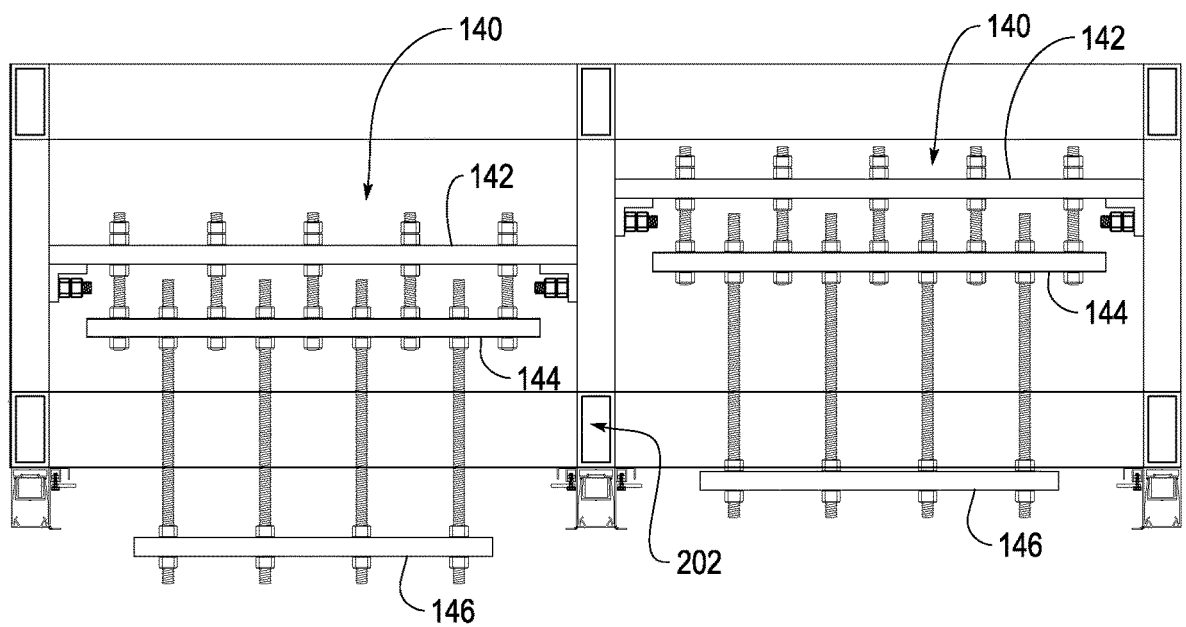
FIG. 14 is a side view of a mounting arrangement, according to embodiments of the present disclosure.

Various embodiments include an adjustable mounting arrangement 140 that allows for varying the height of components, such as a boom arm mounted within the openings. In particular, the adjustable mounting arrangement 140 defines mounting locations within each opening 66 of the truss types 80 that define a frame. The adjustable mounting arrangement 140 in the illustrated embodiment includes a mounting plate 142 that may be mounted within the openings 66 at different locations, in particular, different vertical locations within the opening 66. For example, predefined mounting locations (e.g., mounting bores) may be located on opposing walls of the opening 6 for coupling thereto of the mounting plate 142 (e.g., bolt mounting of the mounting plate 142 to walls of the opening 66). The predefined mounting locations provide a coarse mounting arrangement within the opening 202. For example, as can be seen in FIG. 14, the two mounting plates 142 are mounted at different vertical heights within respective openings 66.

The mounting plates 142 couple to a secondary plate 144 that allows for adjustable mounting thereto of a bottom plate 146. For example, plural bolts 148 may couple the secondary plate 144 (or intermediate plate) to the bottom plate 144 to allow finer height adjustment within the opening 66. As can be seen in FIG. 14, the bottom plate 144 in the different openings 66 extend a different distance from the secondary plate 144 such that the bottom plate 144 in each of the openings 66 is positioned at different vertical heights. As should be appreciated, components to be mounted within each of the openings 202 may be mounted at the same or different vertical heights.

As shown and described, various embodiments provide a mounting system that provides the ability to mount different components, such as standard components thereto. For example, various embodiments allow for mounting to the truss arrangement, LED light troffers, access panels, audio systems and smoke exhausts, among others. It should be appreciated that variations and modifications are contemplated. For example, the size, shape, location, configuration and orientation of the mounting positions may be changed.

Embodiments may be used in relation to a hospital operating room environment. Optionally, embodiments of the present disclosure may be used in various other settings in which pressurized airflow is to be directed in combination with ceiling mounted equipment. For example, embodiments of the present disclosure may be used in dental offices, manufacturing clean rooms, residential spaces, and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A mounting system comprising:
   a frame that includes top and bottom support structures and sidewalls forming a plurality of box truss segments connected to one another to define a box truss structure, each box truss segment comprising of an opening defining a respective mounting location, wherein the mounting locations are configured to receive an interchangeable mounting plate;
   a supply air array receiving an air supply, wherein plurality of box truss segments extend around a perimeter of the supply air array, and define an air supply region, the supply air array configured to direct airflow from the air supply and only from within the perimeter of the supply air array in the air supply region, wherein,
   the plurality of mounting locations are along a perimeter truss arrangement of the box truss segments of the box truss structure and being only outside of the perimeter of the supply air array, the plurality of mounting locations configured to interchangeably couple to one or more components via the interchangeable mounting plate, the frame in combination with the supply air array being configured to prevent the airflow from flowing over or around the plurality of mounting locations such that the airflow does not directly pass through the plurality of mounting locations when the airflow is dispelled from an outlet of the supply air array, the plurality of mounting locations located along a perimeter of the supply air array and outside of the side walls of the frame at one or more sides of the supply air array from the supply air array and outside of the airflow.

2. The mounting system of claim 1, wherein the frame extends around a sterile field of an operating room and wherein the supply air array is configured to direct air into the sterile field of the operating room.

3. The mounting system of claim 1, wherein when a boom mount is coupled to the box truss structure, the interchangeable mounting plate is coupled to one of the plurality of mounting locations and a boom arm is configured to extend from the box truss structure.

4. The mounting system of claim 1, wherein the plurality of mounting locations are sized and shaped to receive therein mounting portions of one or more of an access panel, a light troffer and a boom mount.

5. The mounting system of claim 1, wherein the plurality of mounting locations are configured to include one more predefined mounting configurations.

6. The mounting system of claim 1, wherein one or more mounting locations of the plurality of mounting locations comprise an adjustable mounting arrangement configured to movably couple to the interchangeable mounting plate, wherein a vertical height of the interchangeable mounting plate within the one or more mounting locations is adjustable with the adjustable mounting arrangement.

7. The mounting system of claim 6, wherein the adjustable mounting arrangement comprises a plurality of predefined locations at different vertical heights.

8. The mounting system of claim 6, wherein the adjustable mounting arrangement comprises a secondary plate that adjustably coupled to the interchangeable mounting plate and movable to the vertical height based on movement of an adjustment mechanism.

9. The mounting system of claim 8, wherein the adjustment mechanism comprises a plurality of bolts coupling the secondary plate to the interchangeable mounting plate.

10. The mounting system of claim 1, wherein the airflow creates a laminar airflow directly to a surgical target zone without turbulence.

11. The mounting system of claim 1, wherein the supply air array is sealed from the plurality of mounting locations and wherein the plurality of mounting locations are located outside of a plenum.

12. A mounting system comprising:
a frame that includes top and bottom support structures and sidewalls forming a plurality of box truss segments connected to one another to define a box truss structure, each box truss segment comprising of an opening therethrough defining a respective mounting location;
the plurality of mounting locations located along a perimeter truss arrangement only outside of the frame of the box truss structure, the plurality of mounting locations configured to interchangeably couple to one or more components for use in a sterile environment; and
a supply air array receiving an air supply, wherein the plurality of box truss segments extend around a perimeter of the supply air array, the supply air array is configured to direct airflow from the air supply and only from within the perimeter of the supply air array, and the frame in combination with the supply air array are configured to prevent the airflow from flowing over or around the plurality of mounting locations such that the airflow does not directly pass through the plurality of mounting locations when the airflow is dispelled from an outlet of the supply air array, the plurality of mounting locations located outside of the airflow, and one or more mounting locations of the plurality of mounting locations comprising an adjustable mounting arrangement configured to movably couple to the one or more components, wherein a vertical height of the one or more components within the one or more mounting locations is adjustable with the adjustable mounting arrangement.

13. The mounting system of claim 12, wherein the plurality of box truss segments comprise of at least two groups of box truss segments, each group of box truss segments comprising of box truss segments that are substantially identical to one another and having at least one of different shapes or different sizes with respect to box truss segments of another group and configured for supporting different components or modules.

14. The mounting system of claim 12, wherein the plurality of mounting locations are configured for coarse and fine adjustable height coupling of a component therein.

15. The mounting system of claim 12, wherein the supply air array is mounted within only middle portion mounting locations.

16. The mounting system of claim 15, wherein surgical room equipment is mounted outside of the middle portion mounting locations.

17. The mounting system of claim 12, wherein the frame defines a rectangular configuration with an opening within the rectangular configuration.

18. An operating room comprising:
a floor connected to walls;
a ceiling connected to the walls, wherein a surgical site is disposed at an area between the floor, the walls, and the ceiling;
a mounting system coupled to the ceiling, the mounting system defining a box truss structure having a frame that includes top and bottom support structures and side walls forming a plurality of box truss segments connected to one another to define the box truss structure, each box truss segment comprising of an opening defining a respective mounting location, the plurality of mounting locations configured to interchangeably couple to one or more of an access panel, a light troffer and a boom mount with a mounting plate; and
a supply air array receiving an air supply, wherein the frame extends along a perimeter truss arrangement around a perimeter of the supply air array, the plurality of mounting locations are only outside of the supply air array, the supply air array is configured to direct airflow from the air supply and only from within the perimeter of the supply air array, and the frame in combination with the supply air array are configured to prevent the airflow from flowing over or around the plurality of mounting locations such that the airflow does not directly pass through the plurality of mounting locations when the airflow is dispelled from an outlet of the supply air array, the plurality of mounting locations located outside the airflow, wherein the mounting plate is adjustably mountable at different vertical heights within one or more mounting locations of the plurality of mounting locations.

19. The operating room of claim 18, wherein the frame of the mounting system extends around a sterile field of the operating room.

20. The operating room of claim 18, wherein the plurality of box truss segments comprise of at least two groups of box truss segments, each group of box truss segments comprising of box truss segments that are substantially identical to one another and having at least one of different shapes or different sizes with respect to box truss segments of another group.

* * * * *